(12) United States Patent
Ellis

(10) Patent No.: US 8,940,381 B2
(45) Date of Patent: Jan. 27, 2015

(54) COMPOSITE MATERIALS

(75) Inventor: John Ellis, Duxford (GB)

(73) Assignee: Hexcel Composites, Ltd, Cambridge (GB)

( * ) Notice: Subject to any disclaimer, the term of this patent is extended or adjusted under 35 U.S.C. 154(b) by 392 days.

(21) Appl. No.: 13/289,020

(22) Filed: Nov. 4, 2011

(65) Prior Publication Data
US 2012/0114899 A1  May 10, 2012

(30) Foreign Application Priority Data
Nov. 5, 2010 (GB) .................................. 1018706.0

(51) Int. Cl.
| | |
|---|---|
| B32B 5/12 | (2006.01) |
| B32B 3/00 | (2006.01) |
| B32B 5/02 | (2006.01) |
| B29C 70/38 | (2006.01) |
| B29C 70/54 | (2006.01) |
| B32B 27/04 | (2006.01) |
| B32B 27/12 | (2006.01) |
| B29L 31/08 | (2006.01) |
| B29B 15/10 | (2006.01) |

(52) U.S. Cl.
CPC ............. *B32B 5/024* (2013.01); *B29C 70/386* (2013.01); *B29C 70/547* (2013.01); *B32B 5/022* (2013.01); *B32B 5/026* (2013.01); *B32B 27/04* (2013.01); *B32B 27/12* (2013.01); *B29L 2031/085* (2013.01); *B29B 15/10* (2013.01)
USPC .............................................. 428/114; 428/98

(58) Field of Classification Search
USPC ..................................................... 428/114, 98
See application file for complete search history.

(56) References Cited

U.S. PATENT DOCUMENTS

2001/0031350 A1 * 10/2001 Day et al. .................. 428/317.9
2009/0269596 A1  10/2009 Rocker et al.

FOREIGN PATENT DOCUMENTS

| | | |
|---|---|---|
| AU | 2005232257 | 12/2005 |
| EP | 1117281 | 7/2001 |
| EP | 1321282 | 6/2003 |
| EP | 1338406 | 8/2003 |
| WO | 2008007094 | 1/2008 |
| WO | 2008015082 | 2/2008 |
| WO | 2009128991 | 10/2009 |
| WO | 2012/010293 | 1/2012 |

* cited by examiner

*Primary Examiner* — Brent O'Hern
(74) *Attorney, Agent, or Firm* — W. Mark Bielawski; David J. Oldenkamp

(57) ABSTRACT

A curable prepreg or semipreg material comprising a layer of fibers and a substantially non-flowable curable resin having a layer of porous sheet material on an outer surface, the material allows automatic lay-up of high fiber content prepregs or semipregs typically used in industrial applications such as wind turbine blades.

20 Claims, 4 Drawing Sheets

COMPOSITE MATERIALS

BACKGROUND OF THE INVENTION

1. Field of the Invention

The present invention relates to composite materials, particularly curable prepregs and semipregs, particularly those which find use in industrial applications particularly in wind energy applications such as wind turbine blades. In particular the invention is concerned with providing prepregs and semipregs of high fibre area weight which can be processed in automatic processing machines and which do not require hand lay-up when being moulded and cured. The invention further relates to a method of producing such curable prepregs and semipregs and the processes for the manufacture of articles there from and the articles produced particularly articles having a high fibre loading.

2. Description of Related Art

Composite materials have well-documented advantages over traditional construction materials, particularly in providing excellent mechanical properties at very low material densities. As a result, the use of such materials is becoming increasingly widespread and their fields of application range from "industrial" and "sports and leisure" to high performance aerospace components. Fibre reinforced cured resins are examples of such materials with the nature and type of the fibre, the amount of fibre and the nature of the resin being chosen according to the application. Industrial applications requiring high strength can require high fibre loadings which can make processing in automatic processing machines difficult if not impossible, Prepregs, comprising a fibre arrangement impregnated with resin such as epoxy resin, are widely used in the generation of such composite materials. Typically a number of plies of such prepregs are "laid-up" as desired and the resulting laminate is cured, typically by exposure to elevated temperatures, to produce a cured composite laminate. Automated processes are available for the laying up and curing of such prepregs.

A particular type of prepreg is the so-called semipreg, which involves the fibre arrangement being only partly impregnated with resin, leaving a portion of the fibre arrangement in a "dry" state.

Semipregs can provide lower porosities in the final cured composite material, as the dry regions allow a pathway for entrapped air to escape from the laminate. This is particularly important in wind energy applications, where cost restrictions generally mean that curing takes place out of autoclave and at lower pressures.

In typical automated lay-up machines that lay-up prepregs or semipregs the prepregs or semipregs are automatically fed to a position where they are placed in a stack and condensed by the application of heat and pressure. In order for the stack to be adequately formed under automatic processing conditions it is important that the prepregs or semipregs do not adhere to the feeding equipment and do not form deposits of fibrous debris on the feeding equipment. At the same time the prepregs or semipregs must contain sufficient resin to allow impregnation of the fibres during curing and also provide sufficient fibre to provide the strength required in the finished cured article. To date this has been difficult generally and particularly difficult in the processing of high fibre content semipregs and prepregs required for the production of high strength industrial materials such as wind turbine structures such as blades and spars therefore.

A common semipreg arrangement is to have a layer of curable resin in contact with one or two adjacent layers of fibres which stay essentially dry with only very little resin migrating into the adjacent fibres. Such semipregs find particular use as part of large load-bearing structures e.g. spars for wind turbine blades. Another common arrangement is for the curable resin to be in contact with one adjacent layer of essentially dry fibres and another adjacent layer of resin-impregnated fibres. At high fibre loadings in industrial processing it has been necessary to lay-up the layers by hand.

A common fibre arrangement is woven, biaxial or triaxial, as such overlapping and interaction of the fibres helps to retain the integrity of the semipreg. In wind energy applications it is common for the fibre layers to be heavy weight, such as 600 gsm per layer or more typically from 600 gsm to 1500 gsm. However such semipregs are typically laid down by hand, as they are difficult to process in known types of automated laying apparatus. This is because such equipment relies of a degree of adhesion between the plies in the stack to be present, so that the material being processed can be laid down and adhere to the surface below. Semipregs are dry on their exterior and so seem not be capable of automated lay-up, by known methods as they lack the necessary surface tack. Furthermore, if prepregs or semipregs are employed with sufficient surface tack they can adhere to and form deposits on the automatic processing equipment.

Additionally, such semipregs, particularly the heavy weight variants employed in wind turbine structures, tend to produce excessive fuzz from broken fibres which can build-up in any automated apparatus and cause problems. This is particularly the case with woven or other overlapping fibre arrangements.

It would therefore be highly desirable to develop a method of automatically laying down a semipreg, particularly the heavier weight variants employed in industrial applications such as wind energy structures.

SUMMARY OF THE INVENTION

The present invention therefore provides a structure or laminate suitable for automatic lay-up comprising a core layer comprising a fibrous reinforcement layer and a curable resin said layer being provided on at least one surface with an external layer substantially free from curable resin (i.e. substantially non-resin impregnated).

In a preferred embodiment the fibrous reinforcement layer is provided on both surfaces with a layer substantially free from curable material.

The term "suitable for automatic lay-up" means that the structure or laminate is an intermediary product which can subsequently be processed in automatic equipment for the production of fibre reinforced articles. The structures or laminate are particularly suitable for automatic stacking of the structures or laminate and curing of the stack to produce the desired fibre reinforced article. The invention is therefore concerned with the production of a structure or laminate that obviates the problems associated with automatic processing of fibrous resin structures particularly prepregs and semipregs having a high fibre loading. For automatic lay-up the structure or laminate may be cut into sections of the desired size and then automatically stacked and cured.

In a preferred aspect of the invention the external layer or layers that are substantially free from the curable resin are porous layers and in a particularly preferred embodiment they are fibrous layers which may be woven or non-woven.

In another preferred aspect of the invention the fibres in the fibrous reinforcement layer of the structure or laminate of this invention are unidirectional although the invention can be used with other fibre orientations.

In a first aspect, the invention relates to a curable semipreg material comprising a layer of substantially non-flowable curable resin and a layer of substantially non-resin impregnated unidirectional fibres, the semipreg having a layer of porous sheet material on an outer surface.

Such a semipreg can be successfully automatically laid down using known automated laying methods and apparatus used for prepregs. The unidirectional fibres have less tendency to generate fuzz. Because the fibres are not overlapping, the presence of the external layer which is preferably a porous layer has the additional benefit that it helps to maintain the orientation of the fibres and the integrity of the semipreg.

Furthermore, although dry on its outside surface, as it is fed to the automated laying up apparatus it has been realised that, once the semipreg is passed to the head of the automated laying up apparatus, the application of heat can be employed to cause the resin to become flowable and migrate through to one or both of the outer surface layer and thereby introduce the necessary tackiness at the time of laying up the semipreg to allow automatic processing.

DETAILED DESCRIPTION OF THE INVENTION

Figure 1:
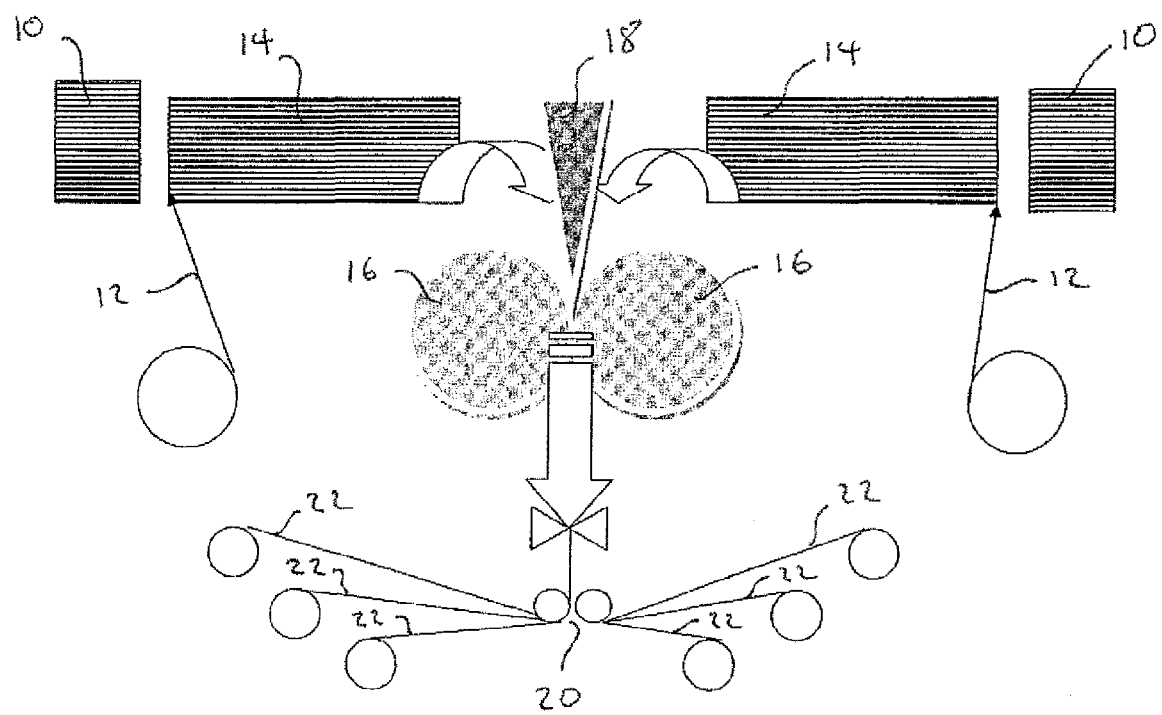
FIG. 1 is a schematic representation of a process according to the invention.

The term "substantially non-flowable" means that the resin substantially remains in position at room temperature and does not migrate significantly into any adjacent fibres. The term "substantially non-resin impregnated" impregnated means that the fibres, except those in direct contact with the resin layer, are essentially resin free with very little resin impregnation.

Typically within the fibrous reinforcement layer substantially there will be a degree of resin impregnation although it is preferred that non-resin impregnated fibres are in contact with the external layer which is preferably porous sheet material.

In a second aspect, the invention relates to a process of manufacturing a curable semipreg material, the process comprising the step of preparing a sheet of porous material having laid thereon fibres, preferably unidirectional fibres, and providing a layer of substantially non-flowing curable resin with the porous material being on an outer surface, and pressing the layers together to form the curable semipreg. In the curable prepreg or semipreg the porous material remains substantially non-resin impregnated after the pressing operation.

The fibres, preferably unidirectional fibres, may form a continuous layer, comprising many fibres deep and covering substantially all of the porous material. However, in a preferred arrangement, the unidirectional fibres are arranged, e.g. on the porous material, as a plurality of longitudinal strips separated from each other by a discrete gap.

Thus, in a third aspect, the invention relates to a sheet of porous material having laid thereon a plurality of strips of unidirectional fibres.

Unidirectional fibres are typically provided as a tow of several thousand fibres and may be way-wound onto a bobbin for convenience of handling. The tow may comprise e.g. 12,000 filaments, or fibres, and have an approximately rectangular cross-section. As the tow is way-wound onto a bobbin, many thousands of meters of length are possible.

In a particularly convenient process, the strips of unidirectional fibres are provided by laying down a plurality of tows of unidirectional fibres onto a surface of the porous material.

The strips of unidirectional fibres are typically of the same width, and the width preferably being no greater than 60 mm, more preferably no greater than 30 mm, most preferably no greater than 15 mm.

The semipreg according to the invention preferably comprises a second layer of unidirectional fibres. In this embodiment, the fibres in the two layers are aligned to be unidirectional in the same direction.

In one embodiment the second layer of unidirectional fibres is substantially non-resin impregnated and are typically in contact with a second porous sheet material located on the other outer surface of the semipreg. In another embodiment, the second layer of unidirectional fibres is impregnated with resin.

Preferably, both first and second layers of fibre are provided as a plurality of longitudinal strips separated from each other by a discrete gap. Moreover, it is preferable that the strips in each layer are aligned with a respective strip on the other layer, so that the semipreg so formed comprises opposing strips of aligned fibres and discrete gaps between the paired strips of fibres.

The layer of substantially non-flowing curable resin may be brought into contact with the sheet or sheets in a variety of ways. However, its non-flowing nature can present processing difficulties.

In a preferred process the substantially non-flowing curable resin is heated to a temperature where it becomes flowable and is then applied to the sheet or sheets of fibrous reinforcement material in a conventional manner, such as by transfer from rollers.

However, in a preferred process the heated resin is passed to cooled rollers, through which at least one sheet is passed. Thus, the resin flows onto the sheet but is simultaneously cooled to a temperature where it is substantially non-flowing. This limits the impregnation of any fibres on the sheet or sheets in the fibrous reinforcement layer, to that necessary to bind the resin to the fibres and avoids excessive impregnation of the external layer or layers.

Thus, in a preferred embodiment, the external layer such as a sheet of porous material having the fibres laid thereon and the substantially non-flowing resin are passed simultaneously through a pair of rollers. Such rollers can also provide the compression required to produce an integral semipreg according to the present invention. The conditions in the rollers being such that the resin will impregnate the fibres but will leave the external layer such as the porous material substantially non-resin impregnated.

Thus, in a preferred embodiment, the external layer such as a sheet of porous material having the fibres laid thereon and the substantially non-flowing resin are passed simultaneously through a pair of rollers. Such rollers can also provide the compression required to produce an integral semipreg according to the present invention. The conditions in the rollers being such that the resin will impregnate the fibres but will leave the external layer such as the porous material substantially non-resin impregnated.

Once formed, the semipreg of the present invention can be rolled onto a core to form a storage-stable semipreg that can be fitted to an automated laying apparatus, such as those conventionally employed for automated lay up of prepregs.

However, often it is desirable to have much narrower sheets of material. For example, when a structure which has a high degree of curvature is being constructed, wide sheets of material can wrinkle and buckle in an attempt to conform to such high curvature regions. Narrower strips of material can conform to high curvature regions without suffering from such difficulties.

Thus, once prepared, the semipreg of the invention can be cut into a plurality of strips, the cuts being aligned with the direction of alignment of the fibres.

In one particularly preferred embodiment, the semipreg comprises unidirectional fibres arranged in a plurality of strips (with either one or two layers) and the cuts are positioned to be aligned with the edges of each strip of fibres. This produces a plurality of strips of semipreg, and the material in the gaps between the fibres can be discarded as waste.

Thus, in one preferred embodiment the semipreg according to the invention has a rectangular cross-section with a well-defined width and thickness. As such a semipreg has been prepared by being cut from a wider sheet, each layer in the prepreg is of the same width, providing the rectangular cross-section.

Typically the width will be no greater than 60 mm, preferably no greater than 30 mm, more preferably no greater than 15 mm, preferably from 10 mm to 60 mm.

Once prepared, the narrow strips of semipreg can be wound onto a core material, e.g. by being way-wound, and the dry nature of the exterior prevents adjacent layers from adhering together.

As discussed above, the porous material sheets help to maintain the integrity of the semipreg by providing a continuous surface on external faces of the semipreg.

When the external layer is a porous material, the porous material sheets are typically an integral sheet held together by interconnecting and/or overlapping fibres. Such fibres may be woven, knitted, or random, e.g. spunlaced or laid scrim, although non-woven, e.g. random is preferred. Such a sheet is often referred to in the art as a veil.

The porous sheet may be characterised by the degree of openness of the sheet, i.e. the percentage of an average surface area of the sheet which is made up of open holes in the sheet. The porous sheets of the present invention typically have a degree of openness of from 10% to 70%, preferably from 20% to 80%, more preferably from 30% to 70%. This helps to maintain a lightweight sheet and also allows the free passage of resin.

Preferred porous sheets are veils that have an areal weight of 1 to 20 grams per square meter (gsm) for layers that range from 0.5 to 50 microns in thickness. Preferred veils are 2 to 35 microns thick and have areal weights of from 2 gsm to 10 gsm. For veils that are from 3 to 20 microns thick, the density of the veil should be such that the areal weight of the layer is from 2 gsm to 8 gsm. Exemplary preferred veil is a 4 gsm veil made from randomly oriented PA12 fibres and is available as 128D04 Nylon veil from Protechnic (Cernay, France). Another suitable nylon veil is 128D06 Nylon veil, which is a 6 gsm PA12 fibrous veil that is also available from Protechnic. 128D04 Nylon fibrous veil has an openness of 70 percent. The heavier 128D06 Nylon fibrous veil has an openness of 50 percent.

The material of the porous material may be selected from a wide range of materials such as polyamides (PA: PA6, PA12, PA11, PA6,6, PA 6,10. PA 6,12, etc), copolyamides (CoPA), ether or ester block polyamides (PEBAX, PEBA), polyphthalamide (PPA), polyesters (polyethylene terephthalate-PET-, Polybutylene terephthalate-PBT— . . . ), copolyesters (CoPE), thermoplastic polyurethanes (TPU), polyacetals (POM . . . ), polyolefins (PP, HDPE, LDPE, LLDPE . . . ), polyethersulfones (PES), polysulfones (PSU . . . ), polyphenylenes sulfones (PPSU . . . ), polyetheretherketones (PEEK), polyetherketoneketone (PEKK), poly(phenylene sulfate) (PPS), or polyetherimides (PEI), thermoplastic polyimides, liquid crystal polymers (LCP), phenoxies, block copolymers such as styrene-butadiene-methylmethacrylate (SBM) copolymers, methylmethacrylate-acrylate of butyl-methylmethacrylate (MAM) copolymers, or a mix of fibers composed of these thermoplastic materials.

The porous material sheets are not intended to be removed from the semipreg and thus remain in place during lay-up and cure, forming part of the eventual composite structure.

The semipregs according to the present invention are suitable for a wide variety of applications and can be fairly heavy or light as appropriate. However, wind energy semipregs tend to be heavier and so they preferably have a weight of from 400 to 1800 gsm, more preferably from 800 to 1500 gsm.

The unidirectional fibres may comprise cracked (i.e. stretch-broken), selectively discontinuous or continuous fibres, although they are preferably continuous.

The structural fibres may be made from a wide variety of materials, such as carbon, graphite, glass, metallised polymers aramid and mixtures thereof. Carbon and glass fibres are preferred.

The curable resin may be selected from epoxy, isocyanate and acid anhydride, for example. Preferably the curable resin is an epoxy resin.

Suitable epoxy resins may comprise monofunctional, difunctional, trifunctional and/or tetrafunctional epoxy resins.

Suitable difunctional epoxy resins, by way of example, include those based on; diglycidyl ether of bisphenol F, diglycidyl ether of bisphenol A (optionally brominated), phenol and cresol epoxy novolacs, glycidyl ethers of phenol-aldelyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, glycidyl esters or any combination thereof.

Difunctional epoxy resins may be preferably selected from diglycidyl ether of bisphenol F, diglycidyl ether of bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl ethers, epoxidised olefins, brominated resins, triglycidyl aminophenyls, aromatic glycidyl amines, heterocyclic glycidyl imidines and amides, glycidyl ethers, fluorinated epoxy resins, or any combination thereof.

Suitable tetrafunctional epoxy resins include N,N,N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY721 from Huntsman Advanced Materials).

The curable resin may also comprise one or more curing agent. Suitable curing agents include anhydrides, particularly poly carboxylic anhydrides; amines, particularly aromatic amines e.g. 1,3-diaminobenzene, 4,4'-diaminodiphenylmethane, and particularly the sulphones, e.g. 4,4'-diaminodiphenyl sulphone (4,4' DDS), and 3,3'-diaminodiphenyl sulphone (3,3' DDS), and the phenol-formaldehyde resins. Preferred curing agents are the amino sulphones, particularly 4,4' DDS and 3,3' DDS.

As discussed above, the semipregs of the present invention are capable of being laid down with an automated laying apparatus.

Thus, in a fourth aspect, the invention relates to a process of laying down a continuous length of semipreg as defined herein onto a substrate by means of an automated laying apparatus.

As discussed above, the semipregs of the present invention are particularly suitable for forming a wind turbine structural component. Thus, preferably the semipreg is laid down to form a wind turbine structural component.

The structures formed are typically cured by exposure to elevated temperature. A convenient curing method involves the so-called vacuum bag technique. This involves placing the component in an air-tight bag and pulling a vacuum to induce a compressive force of up to atmospheric pressure.

Turning to the Figures, FIG. 1 shows a process according to invention. A plurality of carbon fibre tows 10 are fed from a creel (not shown) comprising a plurality of bobbins (not shown) each supporting a respective tow 10. A continuous sheet of porous material 12 is brought into contact with the tows 10 so that they are laid down onto the porous sheet parallel to each other and equally spaced apart. The two porous sheets 12 having laid thereon the unidirectional fibres are then passed simultaneously to a pair of rollers 16. Care is taken to ensure that the strips of fibres on each of the porous sheets are aligned with an opposing strip of fibres.

Also provided is a supply of heated curable resin 18, which is fed to the rollers 16 simultaneously with the porous sheets. The rollers 16 are chilled to below room temperature so that the heated curable resin 18 begins to cool as soon as it meets the sheets of porous material. This cooling results in the resin becoming substantially non-flowable and remaining sandwiched in the middle of the two sheets. Before reaching the substantially non-flowable stage, a little resin impregnates the fibres nearest the resin, which provides a bond between the resin and fibres.

The sheets 14 and resin 18 are gently compressed together by the rollers 16 to produce a semipreg according to the invention.

The semipreg then passes to a cutting stage 20 where cutters are arranged to cut the semipreg along the edges of each strip of fibres.

This produces a plurality of thinner strips of semipreg 22 according to the invention. The portions of porous material and resin located between the parallel strips of fibres are discarded as waste.

Figure 2:
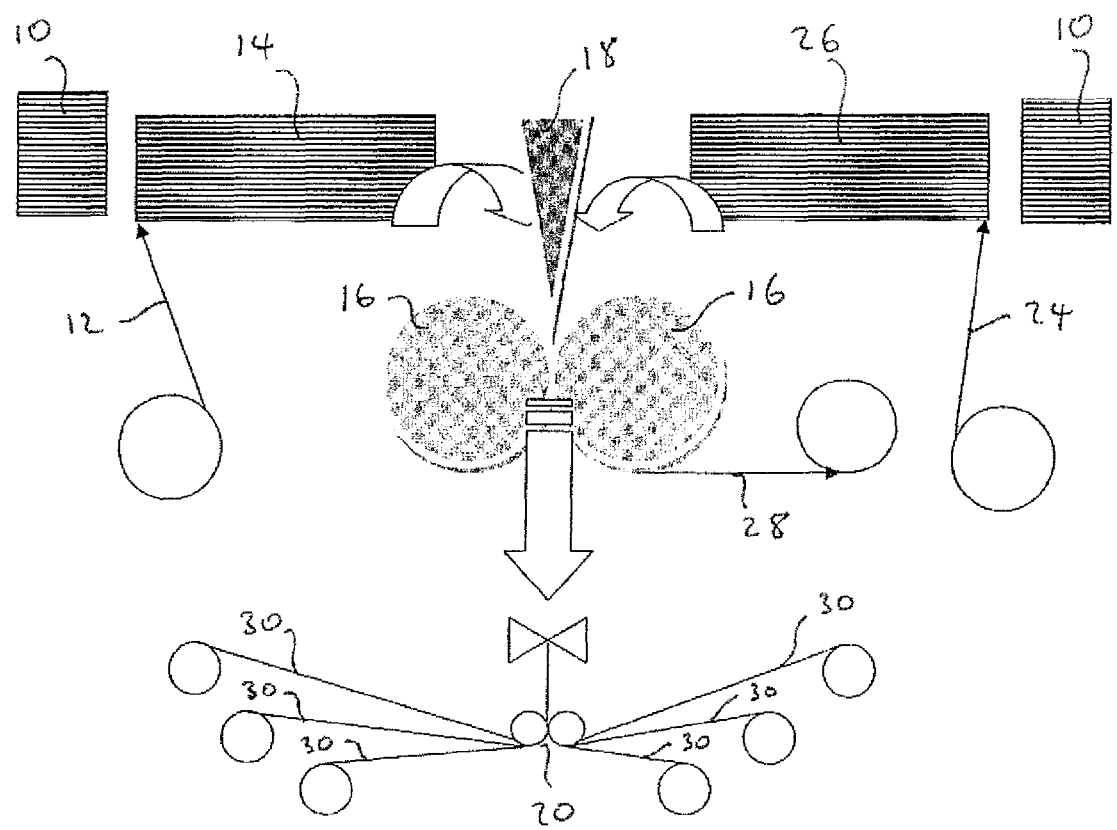
FIG. 2 is a schematic representation of another process according to the invention.

FIG. 2 shows a similar process to that shown in FIG. 1. The same reference numbers have been used when the same process features are adopted.

In this process, only one porous material 12 is employed, the other being replaced with a conventional backing paper 24 having coated thereon a curable resin. As the resin comes into contact with the plurality of tows 10 of fibres, they become impregnated with the resin to form a sheet of backing paper having a plurality of resin-impregnated strips of unidirectional fibres 26.

The sheets 14 and 26 pass to the chilled rollers 16 and resin 18 is introduced between the sheets, as before. Following the rollers the paper 28 is removed, leaving behind a tacky resinous surface. The semipreg thus produced this has one dry surface provided by the porous material and one tacky surface provided by the resinous surface. The asymmetric semipreg then passes to the cutting stage 20 to produce a plurality of strips of semipreg 30, as before.

Figure 3:
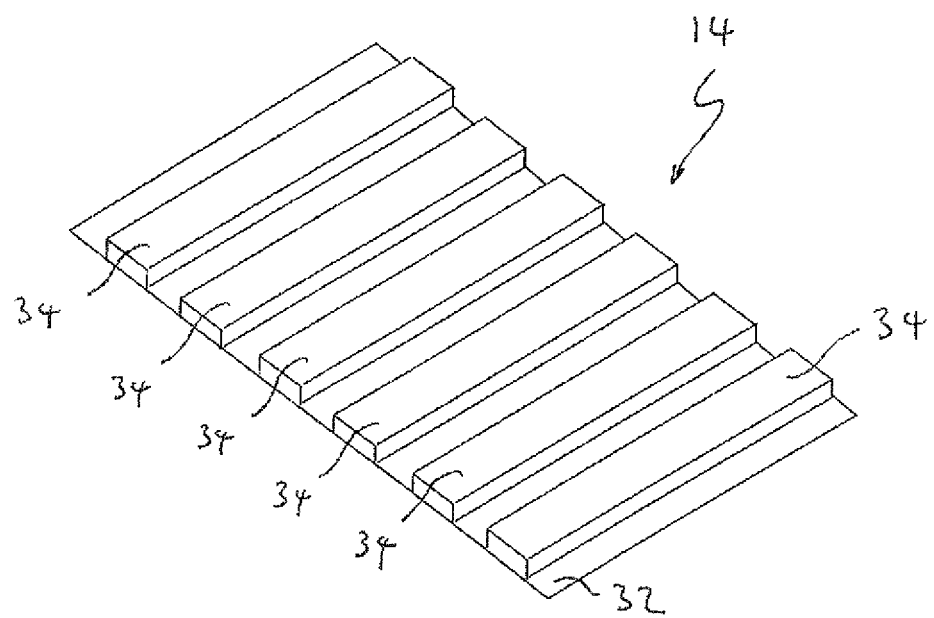
FIG. 3 is a perspective representative view of a portion of a sheet of porous material having laid thereon a plurality of strips of unidirectional fibres, according to the invention.

FIG. 3 shows a perspective representation of a sheet of porous material 14 having laid thereon a plurality of strips of unidirectional fibres. As can be seen, the porous material 32 has laid thereon a plurality of strips of unidirectional fibres 34 arranged parallel to each other each with the same width, such as 1.5 mm, 6.35 mm, 12.7 mm, 25.4 mm, 75 mm, 150 mm, 300 mm, 600 mm or 1200 mm, for example. The fibres are arranged to be parallel to the length of the strips 34. As can be seen, the strips 34 are separated by evenly spaced gaps.

Figure 4:
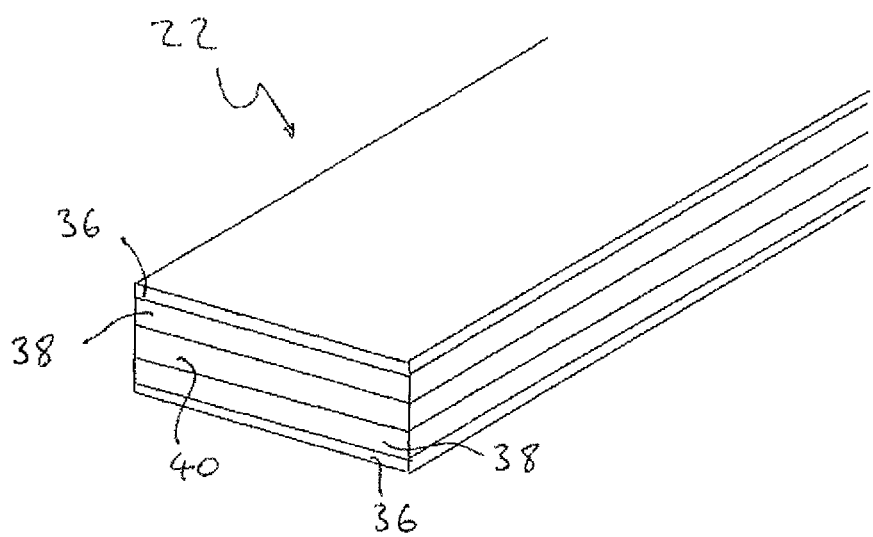
FIG. 4 is a perspective representational view of a curable semipreg material according to the invention.

FIG. 4 is a perspective representation of a strip of semipreg 22 according to the invention, such as can be produced by the process shown in FIG. 1.

The strip 22 has a well-defined rectangular cross-section even though it is made up of a number of layers. The cross-section can have a width of 1.5 mm, 6.35 mm, 12.7 mm, 25.4 mm, 75 mm, 150 mm, 300 mm, 600 mm or 1200 mm for example. The strip 22 comprises two outer sheets 36 of porous material, two layers of substantially non-resin impregnated unidirectional fibres 38 and a central layer of substantially non-flowable curable resin 40.

A length of strip 22 can be rolled up onto a bobbin in a way-wound arrangement. The roll can then be fitted to an automated laying machine which has fitted a heating means near the head. During automated lay up the heating means causes the resin to become flowable, such that it provides the tack necessary for successful adhesion of the semipreg on the substrate.

What is claimed is:

1. A structure comprising:
   A) a first porous sheet having an areal weight of from 1 to 20 gsm, said first porous sheet having an outside surface and an inside surface; and
   B) a plurality of parallel strips located on the inside surface of said first porous sheet, said strips each having a width and being separated from each other by a space having a width wherein each of said parallel strips comprises:
      a) a first structural fiber layer comprising unidirectional fibers wherein the areal weight of said first structural fiber layer is from 400 to 1800 gsm, said first structural fiber layer having an outside surface and an inside surface wherein said outside surface of said first structural fiber layer is located adjacent to the inside surface of said first porous sheet;
      b) a second structural fiber layer comprising unidirectional fibers which are parallel to the unidirectional fibers in said first structural fiber layer wherein the areal weight of said second structural fiber layer is from 400 to 1800 gsm, said second structural fiber layer having an outside surface and an inside surface wherein the inside surface of said second structural fiber layer is located adjacent to the inside surface of said first structural fiber layer; and
      c) a curable resin wherein said curable resin is located at the outside surface of said first structural layer such that said curable resin is in contact with the inside surface of said first porous sheet to provide bonding of said first porous sheet to said first structural fiber layer and wherein said first porous sheet remains substantially non-resin impregnated.

2. The structure according to claim 1 which further comprises a second porous sheet having an areal weight of from 1 to 20 gsm, said second porous sheet having an outside surface and an inside surface wherein the outside surface of said second structural fiber layer is located adjacent to the inside surface of said second porous sheet and wherein said curable resin is located at the outside surface of said second structural layer such that said curable resin is in contact with the inside surface of said second porous sheet to provide bonding of said second porous sheet to said second structural fiber layer and wherein said second porous sheet remains substantially non-resin impregnated.

3. The structure according to claim 1 which further includes a removable backing sheet, said removable backing sheet having an outside surface and an inside surface wherein the inside surface of said backing sheet is coated with a curable resin and wherein the outside surface of said second structural fiber layer is in contact with the coating of curable resin located on the inside surface of said removable backing sheet.

4. The structure according to claim 1 wherein said first porous sheet comprises a first fibrous veil.

5. The structure according to claim 4 wherein said first fibrous veil comprises randomly oriented polyamide fibers.

6. The structure according to claim 4 wherein said first porous sheet has an areal weight of from 2 to 10 gsm.

7. The structure comprising a structure according to claim 3 wherein said removable backing sheet has been removed.

8. The structure according to claim 2 wherein said second porous sheet comprises a second fibrous veil.

9. The structure according to claim 8 wherein said second fibrous veil comprises randomly oriented polyamide fibers.

10. The structure according to claim 9 wherein said second porous sheet has an areal weight of from 2 to 10 gsm.

11. The structure according to claim 8 wherein said first porous sheet comprises a first fibrous veil.

12. The structure according to claim 11 wherein said first fibrous veil comprises randomly oriented polyamide fibers.

13. The structure according to claim 12 wherein said first porous sheet has an areal weight of from 2 to 10 µm.

14. The structure according to claim 1 wherein the width of each of said parallel strips is no greater than 60 mm.

15. A plurality of structures that are formed by removing said first porous sheet located between said parallel strips of the structure according to claim 1.

16. The plurality of structures that are formed by removing said first and second porous sheets located between said parallel strips of the structure according to claim 2.

17. The plurality of structures that are formed by removing said first porous sheet located between said parallel strips of the structure according to claim 7.

18. The fiber reinforced structure comprising one or more structures according to claim 15 wherein the curable resin has been cured.

19. A fiber reinforced structure comprising a plurality of structures according to claim 16 wherein the curable resin has been cured.

20. A fiber reinforced structure comprising a plurality of structures according to claim 17 wherein the curable resin has been cured.

* * * * *